United States Patent
Bisson et al.

(10) Patent No.: US 6,522,449 B2
(45) Date of Patent: Feb. 18, 2003

(54) DEVICE FOR ERASING OVERHEAD MODULATION OF AN OPTICAL SIGNAL

(75) Inventors: Arnaud Bisson, Orsay (FR); Ludovic Noirie, Bagneux (FR); Jean-Claude Jacquinot, Le Kremlin Bicetre (FR); Amaury Jourdan, Sèvres (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/974,854

(22) Filed: Oct. 12, 2001

(65) Prior Publication Data

US 2002/0044330 A1 Apr. 18, 2002

(30) Foreign Application Priority Data

Oct. 13, 2000 (EP) .............................................. 00440275

(51) Int. Cl.[7] .............................. G02F 1/01; H04J 14/02
(52) U.S. Cl. ........................................ 359/249; 359/128
(58) Field of Search ................................. 359/128, 249, 359/279, 322, 246; 370/395.1; 725/106, 105; 385/186, 25

(56) References Cited

U.S. PATENT DOCUMENTS

| 4,330,799 A | * | 5/1982 | Price ............................. 360/40 |
| 4,351,493 A | * | 9/1982 | Sonnek ....................... 242/420.6 |
| 5,383,046 A | | 1/1995 | Tomofuji et al. ............ 359/176 |
| 5,781,327 A | | 7/1998 | Brock et al. ................. 359/249 |
| 2001/0017723 A1 | * | 8/2001 | Chang et al. ................ 359/128 |

* cited by examiner

Primary Examiner—Georgia Epps
Assistant Examiner—Omar Hindi
(74) Attorney, Agent, or Firm—Sughrue Mion, PLLC

(57) ABSTRACT

A device for erasing overhead modulation of an optical signal, wherein said optical signal is injected into an optical device able to modulate the optical signal (for example a semi-conductor optical amplifier driver by a bias control) and for which one an automatic gain control does not need to detect the residual overhead modulation, is characterised in that said bias control means applies to said amplifier a compensation voltage presenting a modulation out of phase with respect to said overhead modulation, and in that modulation index of said compensation voltage is (substantially) proportional to the modulation index of said optical signal.

9 Claims, 1 Drawing Sheet

DEVICE FOR ERASING OVERHEAD MODULATION OF AN OPTICAL SIGNAL

BACKGROUND OF THE INVENTION

The invention is based on a priority application EP 00 440 275.6 which is hereby incorporated by reference.

The invention concerns a device for erasing overhead modulation of an optical signal, wherein said optical signal is injected into an optical device able to modulate the optical signal (for example a semi-conductor optical amplifier driver by a bias control).

The term "overhead modulation" as used herein comprises cases, where a pilot tone (which itself is not modulated with varying information) is used for identifying or other purposes, as well as such cases where the overhead modulation carries a preferably binary information. In the first case, the pilot tone for one specific optical channel is a signal with a pure frequency modulation. In the second case, the overhead modulation is modulated in order to carry the information in +he form of e.g. bits of the value 0 and 1.

SUMMARY OF THE INVENTION

The following concept can be applied to any optical device able to modulate an optical signal (not SOA only).

It is known to erase a pilot tone in that way that the optical signal output from the semi-conductor optical amplifier is sensed, that the detected modulation is inverted, fed back to the control input of the semi-conductor optical amplifier, and that the residual signal of the pilot tone is used to control the inverting electronic amplifier in such a way that the residual signal becomes (as far as possible) zero. This solution needs access to the optical path at the output side of the semi-conductor optical amplifier, and needs, of course, also access to the control terminal of the semi-conductor optical amplifier. This known solution cannot be used in the case of an integrated device for which we do not have access to the output of the SOA. Typically for optical wavelength converters based on a Mach-Zenhder Interferometer structure it is not possible to detect the optical signal between two SOAs.

The invention provides a method which does not need access to the output side of the optical amplifier. The invention, starting with the device stated above, is characterised in that said bias control means applies to said amplifier a compensation voltage presenting a modulation out of phase with respect to said overhead modulation, and in that modulation index of said compensation voltage is (substantially) proportional to the modulation index of said optical signal.

Instead of a closed loop control as used for the above mentioned erasing of a pilot tone, the invention uses an open loop control; therefore, checking of the possible presence of a residual signal of the overhead modulation at the output side of the optical amplifier is not needed. (Nevertheless, for example for testing purposes, it might by advisable to detect the residual signal in any appropriate manner).

The invention needs to sense only the optical signal at the input side of the semi-conductor optical amplifier. From the sensed signal, the wave form of the overhead modulation including the binary information, if any, is gathered, the corresponding signal is inverted, amplified by a factor which takes into account amplification characteristics of the semi-conductor optical amplifier, to which the optical signal is being fed. The such amplified signal is fed forward to a control input of said semi-conductor optical amplifier. Refreshing the original present overhead modulation (or pilot tone) or updating other information may be accomplished by adding the new overhead modulation to the signal for erasing the old overhead modulation and feeding the two signals to the semi-conductor optical amplifier.

The above mentioned amplifying characteristics of the SEMI-CONDUCTOR OPTICAL AMPLIFIER are the response of the optical gain of the SEMI-CONDUCTOR OPTICAL AMPLIFIER versus the electronic control (20). For low amplitude electrical modulations, the first order of this characteristic is linear.

In an embodiment of the invention, the overhead modulation comprises or consists of a pilot tone.

In an embodiment of the invention, the bias control means comprises an inverting electrical amplifier with gain control, such that $$g = V0/P0,$$

where g is the gain, P0 the input voltage of the electrical amplifier corresponding to the mean optical power of the optical signal, and V0 is the mean bias voltage applied to the semi-conductor optical amplifier.

In an embodiment of the invention, the compensation voltage is out of phase by generally 180° with respect to the optical signal.

In an embodiment of the invention, the overhead modulation is sensed from the optical signal at the side of the optical input of the semi-conductor optical amplifier.

In an embodiment of the invention, the bias control means uses the sensed optical signal and, as parameter, known amplification characteristics of the semi-conductor optical amplifier.

The invention also includes a system comprising a device according to the invention, wherein in order to actualise overhead modulation of an optical signal output from the semi-conductor optical amplifier, a new overhead modulation signal is fed to the input for the bias control signal of the semi-conductor optical amplifier.

In an embodiment of the invention, the new overhead signal is added to the signal produced by the bias control means.

BRIEF DESCRIPTION OF THE DRAWINGS

Further features and advantages of the invention will be apparent from the description of preferred embodiments of the invention described on the basis of the attached drawings. The individual features may be present in an embodiment of the invention in any combination.

In the drawings.

DETAIL DESCRIPTION OF PREFERRED EMBODIMENT

The basic idea of the invention consists in controlling "in an open loop" the gain of the electronic inverting amplifier to apply a modulated signal to the bias of the SOA (Semi-conductor Optical Amplifier) which cancels the incoming overhead modulation even if the optical input power, the input modulation index or the SOA driving current fluctuates. It is not necessary to detect a residual optical signal. Therefore, the invention can be applied to an All Optical Wavelength Converter (AOWC) for which the cascaded SOA structure prevent to access to the optical signal inside the device.

Figure 1:
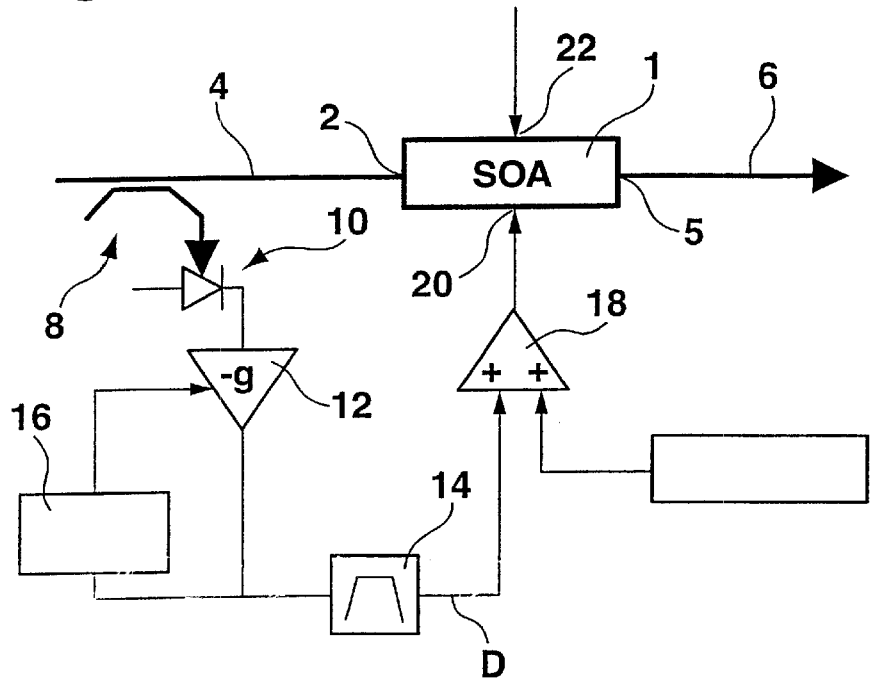
FIG. 1 shows a principle embodiment.

In FIG. 1 is a Semi-Conductor Optical Amplifier (SOA) 1 provided, the optical input interface 2 of which is connected to an input optical fibre 4, and the optical output 5 of which is connected to an output optical fibre 6.

The above mentioned components belong to the optical domain and are depicted with thick lines. The components mentioned below are electric or electronic components, belong to the electronical or electric domain and are depicted with thin lines.

An optical coupler 8 is coupled to the optical fibre 4; the signal coupled out from optical fibre 4 by the optical coupler 8 is sensed by a detector 10 which is symbolised as a photodiode. The electrical output terminal of sensor 10 is connected to an input terminal of an inverting amplifier 12 providing a gain of –g. The output terminal of the amplifier 12 delivers a signal to the input terminal of the band-pass filter 14. Further, the output signal of the amplifier 12 is used by an automatic gain control 16 which delivers the control signal to a control terminal of the amplifier 12. The signal appearing at the output of the band-pass filter 14 is depicted as D and represents the detected overhead modulation present in the signal which is coupled out by the optical coupler 8. This signal D is fed to one input of a voltage adding device 18, the output of which is connected to a modulation input terminal 20 of the SOA 1. The SOA 1 has a further input terminal 22 for supplying the SOA 1 with a bias current.

The automatic gain control 16 works in such a way that it considers the known characteristics of the SOA 1 and outputs a signal to the band-pass filter 14 which signal is proportional to both the modulation index of the over head modulation and the bias current (22).

In case that the optical fibre 4 carries a plurality of optical channels each accompanied by an overhead modulation or by a pilot tone with each a different frequency, all these channels must be demultiplexed to be managed individually.

The signal which is output by the amplifier 12 is not influenced by a binary information carried possibly by the overhead modulation.

The arrangement described thus far performs reading and erasing the overhead modulation detected by the detector 10. Therefore, if no new overhead modulation is added, the optical line 6 would carry the optical signal without pilot tone or overhead modulation. Such signal could for example be delivered to an immediately following interferometric wavelength converter (as is known in the art).

For the further discussion, it is described that particularly simultaneously with an erasing of the "old" overhead modulation "new" overhead modulation is added. This is accomplished by feeding an appropriate signal to the second input of the adding arrangement 18.

Figure 2:
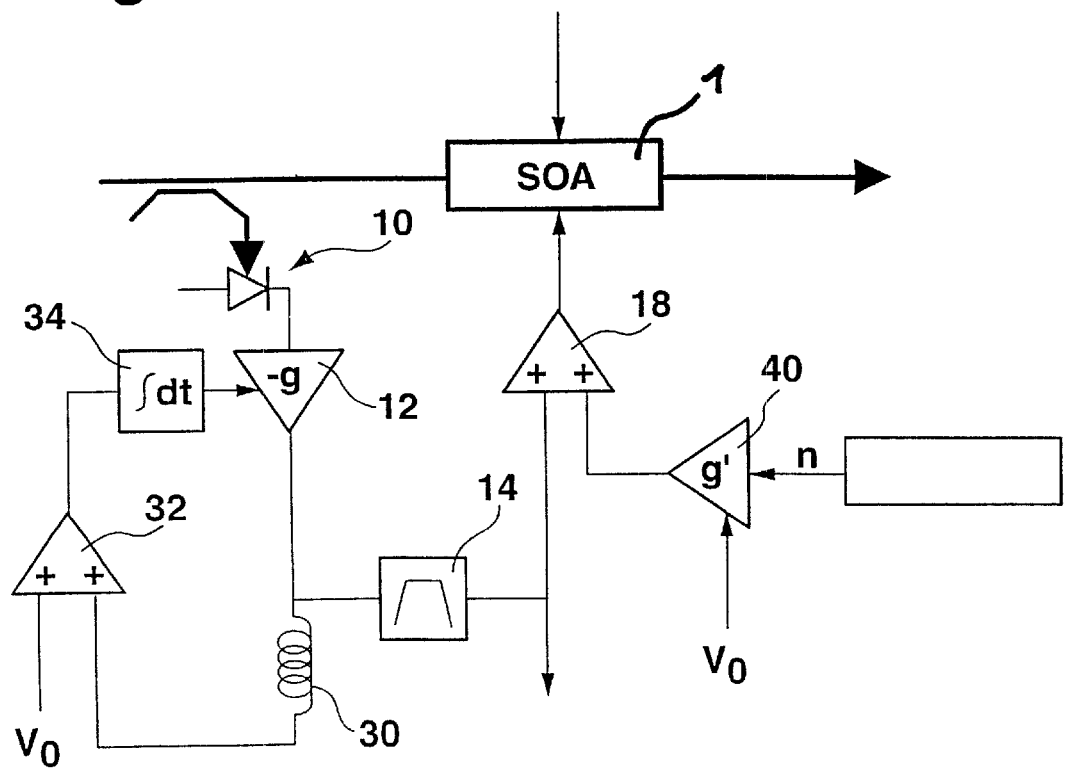
FIG. 2 shows a practical example of the automatic gain control.

FIG. 2 in a practical example, the SOA 1 used is an optical device working for Wavelength Division Multiplexing application at a wavelength around 1550 nm commonly used for amplification, switching or optical wavelength conversion. The overhead modulation consists of a frequency modulation with a frequency of typically 100 kHz and a maximum frequency shift about 10% (modulation index is typically 6%).

The output signal of the adding arrangement 18 is fed to the modulation terminal 20 in such a phase position, that it is 180° out of phase with respect to the overhead modulation carried by the signal on the optical fibre 4.

If the automatic gain control 16 together with the amplifier 12 is carefully adjusted to the characteristics of the SOA 1 which characteristics are known from a data sheet or from measuring results of the specific SOA 1, the optical signal on the optical output line 6 will carry practically no old overhead modulation. This is true even though the output signal of the SOA 1 is not checked with respect to the presence of a residual of the old overhead modulation and even if the optical input power from 4 or the driving current 22 of the SOA fluctuates FIG. 2 is the same arrangement as FIG. 1 showing a practical configuration of the automatic gain control 16.

The amplifier 12 operates in the electrical spectral domain from DC (=0 Hz) up to the frequency of the overhead modulation to be removed. The latter are fed to the band-pass filter 14 and blocked by the impedance 30. The impedance 30 lets pass the continuous current components which are fed to one input of a voltage adding device 32, to the other input of which a voltage Vo (reference voltage) is fed. The output of the adding arrangement 32 is fed to the input of an integrator 34, and the integrated signal is fed to the controlling terminal of the amplifier 12.

In use, the just described arrangement works with the following voltages: The detector 10 puts out a voltage Po (1+m) where m represents the overhead modulation to be removed. The amplifier 12 puts out a voltage –gPo (1+m). The direct current part passing the impedance 30 is –gPo. The alternating current part arriving at the forward end of the band-pass filter 14 is –Vo (1+m). The latter alternating current part is fed to the adding arrangement 18, after the band-pass filter 14 has removed not interesting frequency components, e.g. great parts of noise. The output of the adding arrangement 32 is Vo –gPo. The integrator 34 eliminates quick fluctuations in time of the lost mentioned signal.

That part of the adding arrangement 18, which serves for introducing a new overhead modulation, is in FIG. 2 also somewhat modified and shows an amplifier 40 with a gain g', and to the controlling terminal of the amplifier 40 a voltage Vo is fed.

The input Vo to the adding element 32 may be variable in order to facilitate adjustment of the arrangement.

What is claimed is:

1. A device for erasing overhead modulation of an optical signal, wherein said optical signal is injected into an optical device which modulates the optical signal in accordance with a modulation control signal provided by a controller to a control input of the optical device, wherein
said modulation control signal includes a compensation voltage representing a
modulation out of phase with respect to said overhead modulation, and
a modulation index of said compensation voltage is proportional to a modulation index of said optical signal.

2. A device according to claim 1, wherein the overhead modulation comprises a pilot tone.

3. A device according to claim 1, wherein the controller comprises an inverting electrical amplifier with gain control, such that $$g = V0/P0,$$

where g is the gain, P0 the input voltage of the electrical amplifier corresponding to the mean optical power of the optical signal, and V0 is a mean bias voltage applied to the optical device.

4. A device according claim 1, wherein the compensation voltage is out of phase by substantially 180° with respect to the optical signal.

5. A device according to claim 1, wherein the overhead modulation is sensed from the optical signal at the side of an optical input of the optical device.

6. A device according to claim 1, wherein the modulation control signal has a value based on the sensed optical signal and known amplification characteristics of the optical device.

7. A system comprising a device according to claim 1, wherein in order to provide overhead modulation in an optical signal output from the semi-conductor optical amplifier, a new overhead modulation signal is fed to the control input of the optical device.

8. A system according to claim 7, wherein the new overhead modulation signal is added to a control signal produced by the controller.

9. A device according to claim 1, wherein said optical device is a semi-conductor optical amplifier and said control input is a bias control input.

* * * * *